Patented Sept. 18, 1934

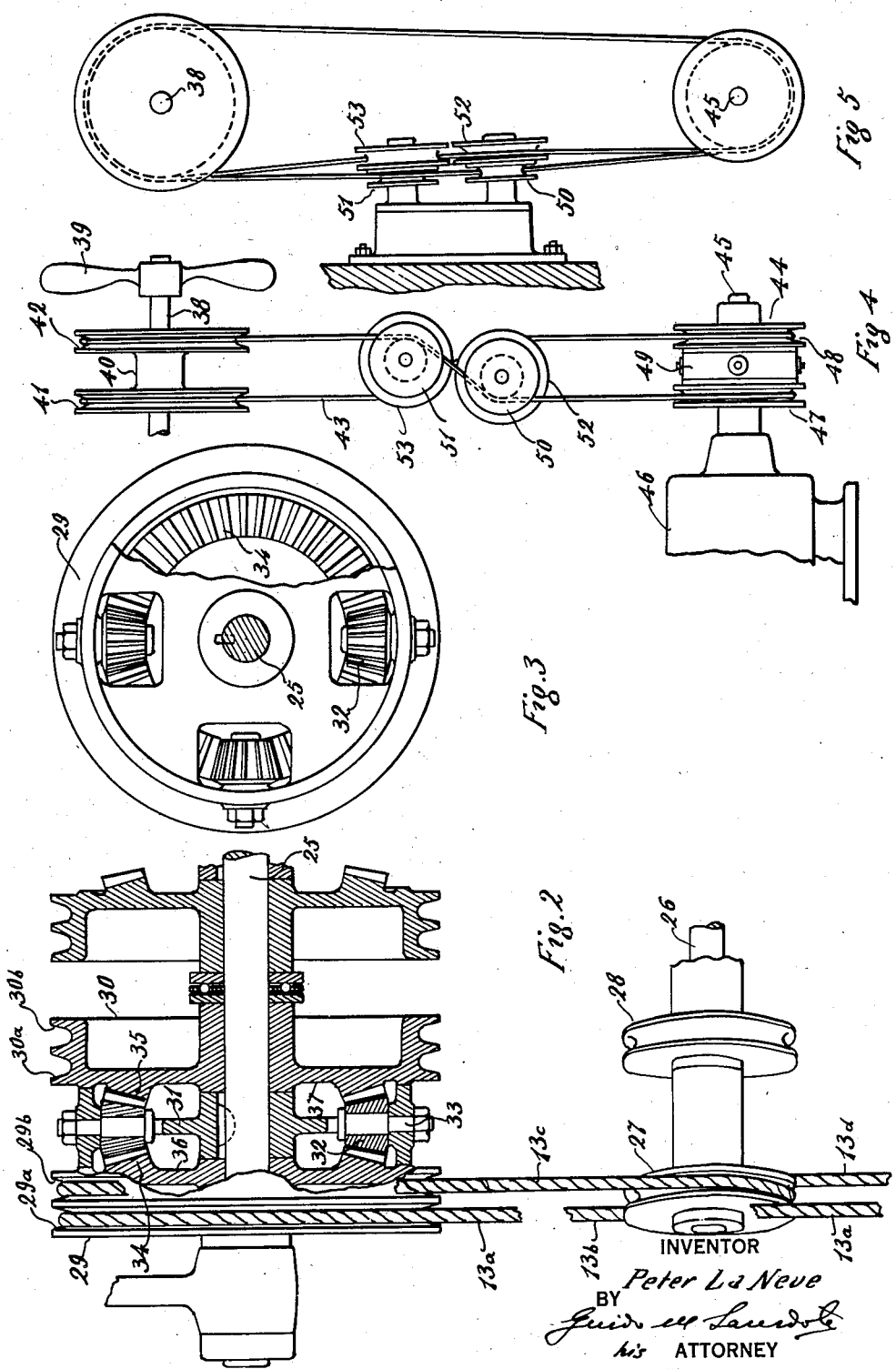

1,974,361

UNITED STATES PATENT OFFICE 1,974,361

DIFFERENTIAL DRIVE FOR MULTIPLE-STRAND CABLE TRANSMISSION

Peter La Neve, Brooklyn, N. Y.

Application May 22, 1933, Serial No. 672,255

4 Claims. (Cl. 187—1)

This invention relates to power transmission and more particularly refers to improvements in devices where the power transmitting means consists of a group of cables or other tension members connecting two elements to be actuated by such tension members.

In a broad sense the invention resides in an improved arrangement of driving or guiding pulley means to be used in conjunction with a plurality of cables or cable strands in installations where it is important that the tension to which said cables or cable strands are subjected be at all times equalized, so that the load may be uniformly distributed among them.

A case in point is presented by elevator installations where each elevator car is generally connected to a counterweight by means of a plurality of cables, arranged to ride over a suitably grooved suspension drum or drums. In installations of this kind it is essential that the weight of the car and the counterweight be at all times equally distributed among the various cables. To this end, a number of different equalizing devices have been heretofore used, all presenting as a common characteristic the possibility of longitudinal shifting of any one cable with respect to the others.

In another application entitled Self-equalizing suspension tackle for elevator cars, Serial No. 668,727, co-pending herewith, I have described and claimed an improved type of suspension, in which the various cables are so connected that the load will be at all times equally distributed among the various cables and such longitudinal slipping of any one cable with respect to the others that should occur during the operation of the car, due to slight variations in the diameter of the grooves within which the cables are made to travel, or other causes, will be readily and instantly taken up by the other cables, so as to equalize the tension to which they are individually subjected.

An important advantage of the arrangement resides in the fact that should any one cable break or otherwise become ineffective, all of the remaining cables will become instantly adjusted to the new conditions, so that the load will become uniformly distributed among said remaining cables. This imparts to the device a maximum factor of safety, which is a highly desirable characteristic in installations of this kind.

However, the operation of transmission and suspension devices of the character mentioned, where the cable or cable strands may be required to slip with respect to one another for the tension equalization to take place, is generally hindered to a considerable extent by the frictional resistance offered by the suspension drum or drums to the slipping of the cables.

Such resistance affects not only the sensitiveness of the equalizing action, but the safety of the installation as well, because it is just such friction which causes the cables to wear away and eventually weaken and break. Furthermore, aside from considerations of safety, which are, of course, of surpassing importance, the possibility of wear of both cables and pulleys or drums is a source of considerable expense both as regards inspection and repairs.

The primary object of this invention is to provide a novel and improved type of driving or suspension pulley or drum for self-equalizing cable transmissions or suspensions, comprising a plurality of cable strands, whereby the equalization of the tension between the various cable strands can freely take place, with the development of virtually no friction between the cable strands and the pulleys or drums over which they are caused to ride.

Another object is to provide in self-equalizing cable transmissions of the character mentioned a novel and improved arrangement of guiding or driving pulleys or drums, whereby the sensitiveness of the equalizing action will be considerably increased and the wear of the operating elements materially decreased.

A further object is to provide a novel and improved type of suspension device for self-equalizing suspension tackles for elevator cars, whereby the equalizing action between the various cables will readily take place with a minimum amount of friction and wear and consequently with a maximum permanence of the factor of safety originally provided in the installation.

Other objects and advantages of the present invention will more fully appear as the description proceeds and will be set forth and claimed in the appended claims.

My invention is illustrated by way of example in the accompanying drawings, in which:

Fig. 2 is a fragmentary side view in elevation, partly broken away and sectioned, of the suspension device shown in Fig. 1;

Fig. 3 is a cross sectional view of the same, showing a differential driving disk employed for driving two adjoining pulleys, said disk being partly broken away to show the pulley behind it;

Fig. 4 is a diagrammatic side view in elevation of an endless cable or belt drive, comprising a plurality of strands, also embodying my invention; and Fig. 5 is a diagrammatic front view thereof.

Figure 1:
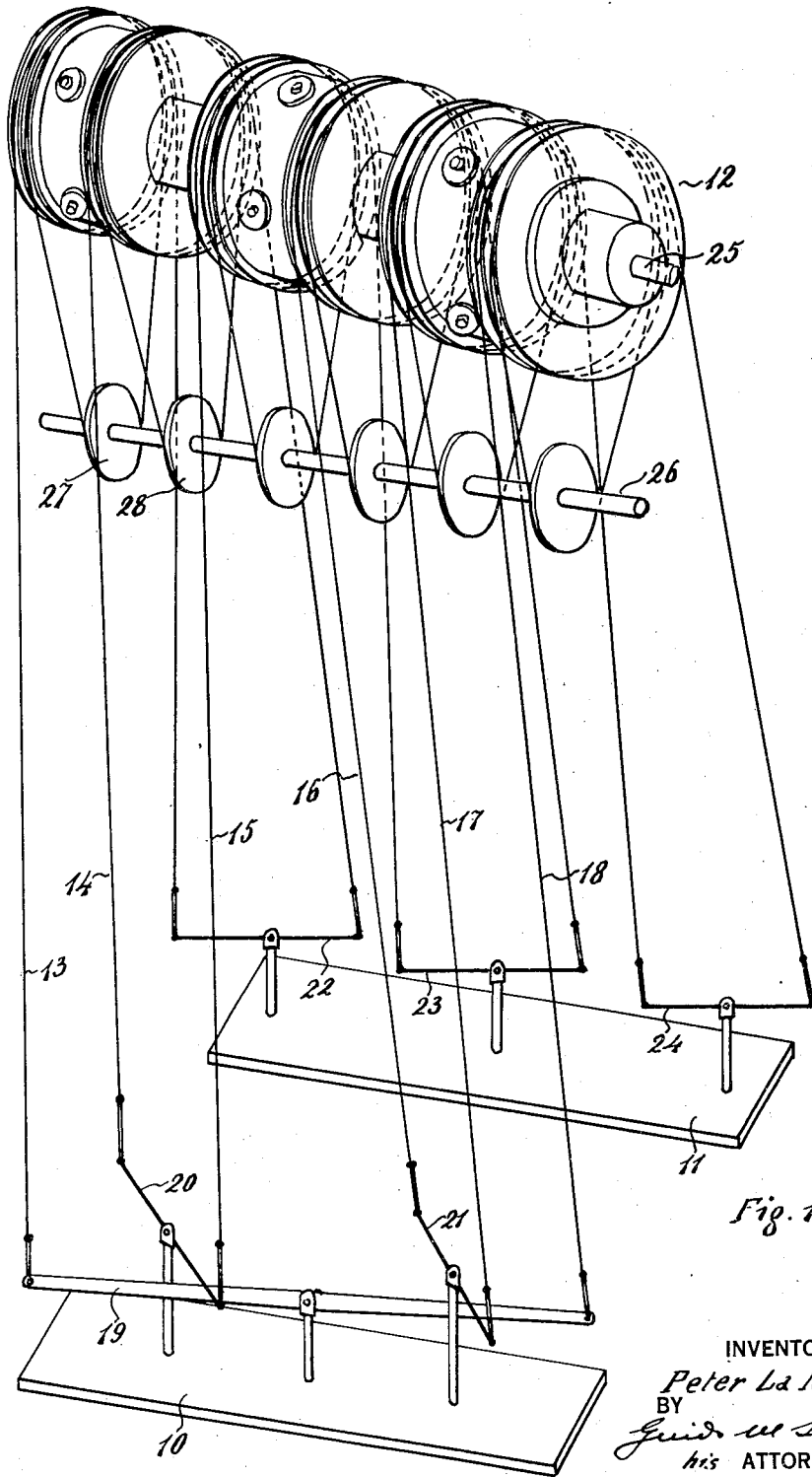
Fig. 1 is a semi-diagrammatic view in perspective of a suspension device, embodying my invention, applied in connection with a plurality of cable strands forming a self-equalizing suspension tackle for an elevator car and its counterweight.

The self-equalizing suspension tackle illustrated in Fig. 1 is of the type illustrated in Fig. 8 of my co-pending application above referred to. In the same, 10 designates the top member of an elevator car, 11 the top member of the counterweight and 12 the suspension device which takes the place of the suspension drum or drums ordinarily used.

The elevator car and its counterweight are connected by a suspension tackle, comprising six unitary cables 13, 14, 15, 16, 17, 18, running back and forth between the car and the counterweight and riding over the suspension device, said cables being interconnected by various rocking levers; namely, at the car end rocking levers 19, 20, 21, interposed respectively between cables 13—18, 14—15, and 16—17 and at the counterweight end rocking levers 22, 23, 24, interposed respectively between cables 13—14, 15—16, and 17—18.

By virtue of the arrangement shown, all the six cables virtually form an endless cable of which the rocking levers form a part, said rocking members constituting connections between said cables and the elevator car and counterweight and at the same time acting as instantly responsive equalizing elements between the elements connected thereto.

The total load carried by the tackle is, therefore, uniformly distributed between the six cables and such longitudinal displacements of any one cable with respect to the others that should occur during the operation of the car will be readily compensated by complementary displacements of the other cables so as to equalize the tension to which they are individually subjected.

In the type of multiple-groove suspension drum ordinarily employed, the longitudinal slipping movements of the cables, due to the equalizing action, naturally result in the development of a material amount of friction between the slipping cables and the grooves, and as explained in the premises, this friction is directly responsible for the wear of both cables and the suspension drum and for the ultimate weakening and breaking of the suspension cables. When the grooved drum is used not only as a suspension means, but also as a driving means for the tackle, each cable is usually made to ride over two adjoining grooves and a guiding idle pulley so as to form two loops over the drum before it is extended from one of the interconnected elements to the other. This is done, of course, in order to provide a good non-slipping driving action between the drum and the cables, by providing an extended circumferential contact therebetween. The very fact that the suspension drum is also a driving drum naturally presupposes the absence of slipping between the driving and driven elements and while this is an essential requirement in a flexible drive, it constitutes a hindrance to the proper working of a self-equalizing tackle, insofar as the tension equalization is concerned, because the tension equalization between the various cables can only occur if the cables are free to move longitudinally with respect to one another.

The suspension device illustrated in Figs. 1, 2, 3, which is also a driving device for the suspension tackle, permits both an effective driving action and an effective equalizing action, said device being so designed that shifting of the cables can freely and instantly take place whenever conditions require it, without the development of any sliding friction; the longitudinal displacement of the cables being transmitted to and shared by the pulleys over which said cables are made to ride, said pulleys being free to rotate in accordance and in unison with the shifting movements of the cables.

In accordance with my invention each set of two cables is driven by a single element interposed between two pulleys, each cable of the set being made to ride over one of said pulleys, the driving element interposed between said two pulleys permitting differential movements therebetween. Where the device acts not only as a suspension means but also as a driving means for the cables, as in the case illustrated, each pulley of each set is preferably formed with two adjoining grooves and its respective cable is caused to form two loops, one over each groove, by being caused to ride over an idle pulley, guiding the cable in its way from one groove to the other.

Referring more particularly to Figs. 2, 3, illustrating in detail one of the driving sets for two adjoining cables, 25 designates the shaft of the suspension pulleys, which is in this case the driving shaft, and 26 designates the shaft on which are rotatably mounted the guiding pulleys, such as 27, 28. The driving set illustrated comprises driving pulleys 29, 30, for cables 13, 14, of Fig. 1, said pulleys being formed with two grooves 29a—29b and 30a—30b, respectively. This makes it possible for each cable to form two loops about its driving pulley; for instance, in the case of cable 13 it is seen that its strands 13a extends from one end of equalizing lever 19 of the elevator car to and about groove 29a, then it extends as strand 13b from groove 29a to and around groove 27a of guiding pulley 27, then it extends as strand 13c to groove 27a to and about groove 29b, then as strand 13d from groove 29b to one of the ends of equalizing lever 22 of the counterweight.

Pulleys 29, 30 are loose on shaft 25 and are axially spaced from each other, so as to permit the insertion therebetween of a common driving disk 31, fixed upon said shaft. Said disk carries a plurality (four in the example illustrated) of circumferentially spaced bevel pinions 32, rotatably mounted on radially arranged shafts 33. Said pinions are in mesh with two bevel geared crowns 34, 35, provided upon the inner faces 36, 37, of pulleys 29, 30.

It is to be understood that while pulleys 29, 30, are free to rotate upon shaft 25, they are suitably restrained against axial displacement with respect to each other and to disk 31, so that the rotation of disk 31 causes the simultaneous engagement of said two pulleys by pinions 32, so that as a consequence the pulleys will share the rotation of the disk 31 and shaft 25. So long as no tendency develops in the various cables to shifting for equalization purposes, no change takes place in the relation between pulleys 29, 30 and disk 31. When shifting of the cables is required in order to maintain an even distribution of the load, it is obvious that in a set of six cables, such as shown in Fig. 1, while three cables shift in one direction the other three cables will shift in the opposite direction. The same is true of each set of two adjoining cables, such as 13, 14, since it is obvious that the pull of cable 13 in one direction for instance will cause equalizing lever 22 to pull cable 14 in the opposite direction. Therefore, when such shifting of the two cables in opposite directions occurs, pulleys 29, 30 can accordingly rotate with respect to each other in opposite directions, causing pinions 32 interposed therebetween to also rotate upon their respective shafts 33. As soon as the tension has been equalized between the two cables there will be no more tendency for one cable to shift with respect to the other and pinions 32 will resume their purely driving action, transmitting movement from disk 31 to pulleys 29, 30.

The action thus taking place is similar to that occurring in the well-known differential gearing, such as is extensively used in motor cars, and no further explanation is, therefore, deemed necessary. It is obvious that as a result of the arrangement described a positive driving action can take place and at the same time the shifting movements of the cables can freely occur, without any slippage of the cables with respect to the pulleys. The equalizing system can, therefore, function rapidly and effectively without causing any undue wear of either the cables or pulleys through friction.

My invention is also applicable in the case of a cable drive, comprising an endless cable running between the driving and the driven pulleys so as to form a plurality of loops or strands.

This possibility is illustrated in Figs. 4 and 5, in connection with an endless cable drive comprising only two loops. In the same, 38 designates a shaft carrying a fan 39 and a pulley 40, having two grooves 41, 42. Said pulley is driven by an endless belt or cable 43, connecting the same to driving unit 44 embodying my invention, mounted on driving shaft 45 of an electric motor 46.

The driving unit comprises two driving pulleys 47, 48, rotatably mounted on shaft 45, and a differential driving disk 49 interposed therebetween, and connected thereto by a system of differential pinions and gears (not shown), such as described in connection with Figs. 2 and 3.

As shown in the drawings the driving belt from pulley 43 runs over two deflecting pulleys 50, 51, thence to groove 42 of pulley 40 and then to driving pulling 48, returning to groove 41 of pulley 40 and back to driving pulley 47 by riding over deflecting pulleys 52, 53. Due to the differential mechanism employed at the driving end, it will be seen that the tension between the various strands of the endless belt will be at all times automatically equalized. The same principle can, of course, be extended to the case where a greater number of strands or loops will require the employment of more than one differential driving unit.

From the foregoing it will be seen that I provide a novel and improved arrangement whereby the tension equalization between various cable units, together forming in effect a single or an endless cable, can freely occur without slippage of the cable units with respect to their driving and guiding elements and, therefore, without any considerable amount of friction. It is obvious that my differential device can be employed either at the driving or at the driven ends of a cable transmission, or both.

The constructional details of the devices embodying my invention may vary from those shown without departure from the inventive idea; the drawings will, therefore be understood as being intended for illustrative purposes only and not in a limiting sense.

I accordingly reserve the right to carry my invention into practice in all those ways and manners which may enter, fairly, into the scope of the appended claims.

I claim:

1. The combination with an elevator car, a counterweight therefor, a plurality of cables extending between said car and counterweight, and a plurality of equalizing elements on the car and counterweight respectively connected to the ends of said cables so as to form a single tackle running alternately from one of the two first mentioned bodies to the other, of a suspension device for said tackle comprising a shaft, pulleys for said cables rotatably mounted upon said shaft, and differential driving means for said pulleys, carried by said shaft, permitting relative angular displacements of said pulleys, in accordance with changes in equalization conditions.

2. The combination with an elevator car, a counterweight therefor, a plurality of cables extending between said car and counterweight, and a plurality of equalizing elements on the car and counterweight respectively connected to the ends of said cables so as to form a single tackle running alternately from one of the two first mentioned bodies to the other, of a suspension device for said tackle comprising a shaft, and a differential driving device for each set of two adjoining cables, mounted on said shaft, said driving device comprising two axially spaced pulleys, one for each cable in the set, rotatably mounted upon said shaft, each pulley being provided with a bevel gear at the side facing the other pulley, and a driving member for, and interposed between said pulleys, fixed upon said shaft, said driving member carrying one or more idle pinions simultaneously in mesh with said gears.

3. In a self-equalizing device for an elevator car and its counterweight, a plurality of cables extending between said car and said counterweight, capable of longitudinal shifting movements with respect to one another for purposes of tension equalization between said cables, and a driving device for said cables comprising a shaft, driving pulleys for said cables, operatively associated with said shaft, and means permitting angular displacements of said pulleys with respect to one another and to said shaft, in order to follow longitudinal shifting movements of their respective cables due to changes in load distribution conditions.

4. The combination with an elevator car, a counterweight therefor, a plurality of cables extending between said car and counterweight, and a plurality of equalizing elements on the car and counterweight respectively connected to the ends of said cables so as to form a single tackle running alternately from one of the two first mentioned bodies to the other, of a suspension device for said tackle comprising a shaft, pulleys for said cables rotatably mounted upon said shaft, and differential driving means for said pulleys, permitting relative angular displacements of said pulleys, in accordance with changes in equalization conditions.

PETER LA NEVE.